(12) United States Patent
Uskela

(10) Patent No.: US 7,043,246 B2
(45) Date of Patent: May 9, 2006

(54) ROUTING OF CALL MADE TO SUBSCRIBER

(75) Inventor: Sami Uskela, Helsinki (FI)

(73) Assignee: Nokia Corporation, Espoo (FI)

( * ) Notice: Subject to any disclaimer, the term of this patent is extended or adjusted under 35 U.S.C. 154(b) by 536 days.

(21) Appl. No.: 10/035,339

(22) Filed: Jan. 4, 2002

(65) Prior Publication Data

US 2002/0090950 A1 Jul. 11, 2002

(30) Foreign Application Priority Data

Jan. 5, 2001 (FI) .................................. 20010018

(51) Int. Cl.
*H04Q 7/20* (2006.01)
*H04M 1/00* (2006.01)
*H04B 1/38* (2006.01)

(52) U.S. Cl. ................. 455/445; 455/432.3; 455/435.1; 455/461; 455/550.1; 455/517; 455/560

(58) Field of Classification Search ............ 455/414.1, 455/414.2, 414.3, 417, 432.3, 433, 435.1, 455/445, 517, 406, 409, 422.1, 424–425, 455/461, 560, 550.1; 379/221.01, 207.02, 379/201.02, 201.03; 370/310, 351–352
See application file for complete search history.

(56) References Cited

U.S. PATENT DOCUMENTS

| | | | | |
|---|---|---|---|---|
| 5,850,603 A | * | 12/1998 | Lantto et al. | 455/433 |
| 5,854,836 A | * | 12/1998 | Nimmagadda | 379/221.13 |
| 5,978,681 A | * | 11/1999 | Bertacchi | 455/445 |
| 6,151,503 A | * | 11/2000 | Chavez | 455/445 |
| 6,363,251 B1 | * | 3/2002 | Huang et al. | 455/432.1 |
| 6,473,626 B1 | * | 10/2002 | Nevoux et al. | 455/560 |
| 6,546,247 B1 | * | 4/2003 | Foti et al. | 455/433 |
| 6,625,258 B1 | * | 9/2003 | Ram et al. | 379/88.13 |
| 2001/0031635 A1 | | 10/2001 | Bharatia | |
| 2002/0037723 A1 | | 3/2002 | Roach | |

FOREIGN PATENT DOCUMENTS

| WO | WO 00/13454 | 3/2000 |
|---|---|---|
| WO | WO 01/91419 | 11/2001 |

* cited by examiner

*Primary Examiner*—William Trost
*Assistant Examiner*—Meless Zewdu
(74) *Attorney, Agent, or Firm*—Pillsbury Winthrop Shaw Pittman LLP

(57) ABSTRACT

A service associated with a call terminating at a subscriber can be triggered from a network node serving the subscriber when the subscriber is registered in the network and has a serving network node. In order to trigger the service also when the subscriber is not registered in the network, the network is provided with a service function which triggers the service for the subscriber when the subscriber is not registered in the network; and the call terminating at the subscriber is routed to this service function when the subscriber is not registered in the network.

39 Claims, 1 Drawing Sheet

ROUTING OF CALL MADE TO SUBSCRIBER

FIELD OF THE INVENTION

The invention relates to routing of a call made to a subscriber in a communication system during the time the subscriber is not registered in a network. Particularly the invention relates to routing of a call made to a subscriber in 'the third generation mobile communication systems'.

BACKGROUND OF THE INVENTION

There is a wide variety of services provided through communication systems, particularly mobile communication systems, and new services are planned all the time. More and more of these services are likely to be non-standard services. For example, a large number of value added services, such as call forwarding, are standardized in the GSM system (Global System for Mobile communications), but it seems that these value added services will not be standardized in 'the third generation mobile communication systems', such as the UMTS (Universal Mobile Telecommunications System), but they are produced by using a variety of toolkits or protocols utilizing intelligent network-like control. Examples of these include CAMEL (Customised Applications for Mobile network Enhanced Logic), SIP (Session Initiation Protocol), OSA (Open Service Architecture), Parlay API (Application Protocol Interface), MexE (Mobile station Execution Environment) and SAT (SIM Application Toolkit).

The object of the 3GPP AII-IP system, i.e. a UMTS system based on IP technology (Internet Protocol technology) and defined in the $3^{rd}$ generation partnership project 3GPP, is that services associated with a mobile-terminating call are at least started, i.e. triggered from a call state control function S_CSCF serving the subscriber, whereto an interrogative call state control function I_CSCF routes the call on the basis of the address obtained from a home subscriber server HSS. The interrogative call state control function I_CSCF is the function through which calls terminating at the subscriber are routed. In systems where the signaling and the actual call are routed separately, call routing refers to the routing of signaling.

Sometimes, however, a subscriber is not registered in the system, for example because the user equipment of the subscriber is switched off. Thus the subscriber does not have a serving call state control function S_CSCF, nor the control function that would trigger the services associated with a mobile-terminating call, such as services associated with the forwarding of a terminating call.

One solution to the above problem is to provide these services by means of the interrogative call state control function I_CSCF. In this solution, the home subscriber server HSS would transmit the subscriber's service information, for example CAMEL subscriber information CSI, as a routing instruction to the interrogative call state control function, when the subscriber is not registered in the network. The problem of this solution is, however, that the I_CSCF should have a complete service interface, such as a CAMEL interface, it should be capable of dynamically triggering call state models and maintaining outgoing legs possibly associated with the service. In other words, the I_CSCF should contain a wide variety of functions. Since the I_CSCF very likely becomes the critical element of the system, it would be preferable that it would be as simple a device as possible, which is provided with only a few functions, so that its performance could be optimized without the above mentioned features required for providing the service.

BRIEF DESCRIPTION OF THE INVENTION

It is thus an object of the invention to provide a method and an apparatus implementing the method such that the above problems can be solved. The object of the invention is achieved by a method, a system, network nodes and user equipment, which are characterized in what is said in the independent claims. The preferred embodiments of the invention are disclosed in the dependent claims.

The invention is based on providing the network with a service functionality by which those services of a subscriber not registered in the network are handled that are associated with calls terminating at the subscriber, i.e. mobile-terminating calls, and giving the address of the network node including the above service functionality as a routing address for the call terminating at the subscriber when the subscriber is not registered in the network. The invention provides the advantage that in each occasion, the subscriber can be provided with services associated with a terminating call so that very few changes need to be made to the existing network nodes. Network nodes routing the terminating call need not be changed; it is quite sufficient that the network node giving routing information is arranged to give the address of the network node including the above service function, when the subscriber is not registered in the network. This way, for example, the performance of the I_CSCF can be optimized and the device can be kept as simple as possible.

In a preferred embodiment of the invention, at least one service content in the user equipment of the subscriber is loaded to the network node responsible for the services of an unregistered subscriber. Furthermore, this embodiment provides the advantage that some of the services associated with the mobile-terminating call can be implemented in the user equipment, but at the same time it can be made sure that these services can also be provided in cases where the subscriber is not registered in the network and the user equipment cannot thus provide the above services.

BRIEF DESCRIPTION OF THE DRAWINGS

In the following the invention will be described in greater detail in connection with the preferred embodiments, with reference to the attached drawings, in which.

DETAILED DESCRIPTION OF THE INVENTION

The present invention can be applied to any communication system where services intended for a subscriber are triggered from a network node serving the subscriber, the address of which network node is not a subscriber-specific constant but which address is to be detected from subscriber data when a mobile-terminating call is routed. Such systems include 'the third generation mobile communication systems', such as UMTS and IS-41, and the GSM system and the corresponding mobile communication systems, such as DCS 1800 (Digital Cellular System for 1800 MHz) and PCS (Personal Communication System), and systems based on the above mentioned systems, such as GSM 2+ systems. In the following the invention will be described by using the 3GPP AII-IP system as an example without restricting the invention thereto. The specifications of mobile communication systems, and the third generation mobile communication systems in particular, progress quickly. This may require additional changes to the invention. Therefore, all words and expressions should be interpreted broadly and they are intended for illustrating, and not restricting the invention.

In the 3GPP AII-IP system 1, a difference is made between an access layer and a telephony layer, which may both have their own operators. (The division into layers is not shown in FIG. 1.) Usually the access layer provides the user with a wireless access to external networks, such as IP networks (Internet Protocol), and the services thereof, such as Internet telephony (IPT, IP Telephony), such that the telephony layer is responsible for control. The IP telephony is in practice invisible to network nodes of the access layer, and they do not participate in the routing of the IP telephony. However, there are signaling connections from each level to various service platforms, such as a service control point of an intelligent network and an IP telephony application server (service platforms are not shown in FIG. 1). IP telephony is a general term covering services from a standard voice telephony (VoIP, Voice over IP) to multimedia applications using IP data, voice and video.

Figure 1:
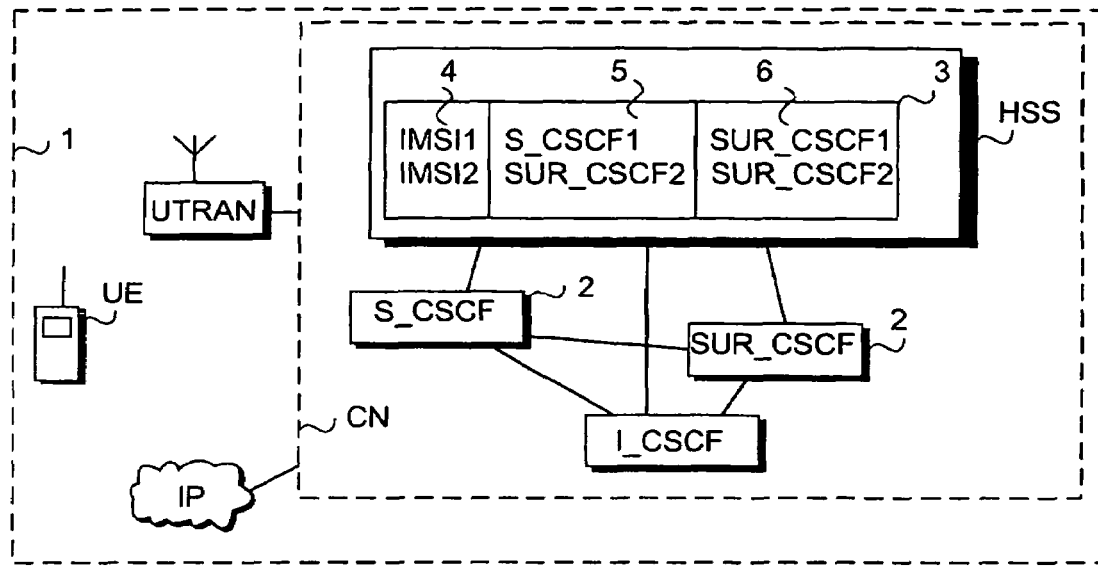
FIG. 1 is a block diagram illustrating a system according to a first preferred embodiment of the invention.

FIG. 1 shows a simplified network architecture and illustrates only those elements of the communication system 1 that are essential for understanding the invention. Network nodes shown in FIG. 1 are logical units the implementation of which may differ from what is described here. It is obvious to a person skilled in the art that the system 1 also comprises other functions and structures, which need not be described in greater detail here.

User equipment UE comprises the actual terminal and a detachably connected identification card USIM, also called a subscriber identity module. In this context, the user equipment UE generally means the entity formed by the subscriber identity module and the actual terminal. The subscriber identification unit USIM is a smart card which comprises subscriber identity, performs authentication algorithms and stores authentication and cipher keys and subscription information necessary for the user equipment. The actual terminal can be any equipment capable of communicating in a mobile communication system. The terminal can thus be a simple terminal intended only for speech, or it can be a terminal for various services, operating as a service platform and supporting the loading and carrying out of different service-related functions. The terminal can also be a combination of various devices, for example a multimedia computer with a Nokia card phone connected to it to provide a mobile connection. The user equipment operation according to a first preferred embodiment of the invention is explained in greater detail in connection with FIG. 2.

In the example of FIG. 1, the system 1 comprises a core network CN and a UMTS terrestrial radio access network UTRAN. The UTRAN is formed of a group of radio network subsystems (not shown in FIG. 1) which are connected to the core network CN. A radio network subsystem can be based on the GPRS (General Packet Radio Service) of the GSM system, for example. The core network CN can be connected to external networks, such as IP networks IP. In the example of FIG. 1, the core network comprises a home subscriber server HSS, an interrogative call state control function I_CSCF and two serving call state control functions 2: S_CSCF, which serves the user registered in the network and SUR_CSCF, which serves the user that is not registered in the network.

The serving call state control function S_CSCF is a network node which participates in controlling a call made by the user equipment of a subscriber and in supporting the establishment of calls terminating at the subscriber registered in the network, as well as in supporting the triggering of the services associated with these calls when the triggering conditions are fulfilled. In other words, the S_CSCF controls call establishment and contains, among other things, a function corresponding to an intelligent network service switching function and the call state models of the IP telephony, by which the call establishment is controlled together with other network nodes, such as a service control point and IP telephony application servers (these are not shown in FIG. 1). The S_CSCF is the network node through which the signaling of a mobile-terminating call is transferred from the actual IP network IP, for instance. The S_CSCF usually contains a subscriber database which logically corresponds to the visitor location register of the GSM system.

The SUR_CSCF, a call state control function serving unregistered subscribers, is a function to which calls terminating at subscribers that are not registered are routed. The SUR_CSCF supports the establishment of calls terminating at a subscriber that is not registered in the network and the triggering of services associated with these calls when the triggering conditions are fulfilled. The SUR_CSCF triggers the service in a service execution environment which is either external or internal. The interface to the external environment may be based, for example, on distributed object oriented technologies, such as CORBA (Common Object Request Broker Architecture), or one of the control protocols of the Intelligent Network. The execution environment may be based on Java virtual machine, for example. The SUR_CSCF contains service control interfaces, such as a CAMEL interface, that are necessary for controlling calls terminating at subscribers. In the first preferred embodiment of the invention, the SUR_CSCF thus includes call state models of the IP telephony, for instance, which are used together with other network nodes, such as a service control point and IP telephony application servers (these are not shown in FIG. 1), for controlling the establishment of a mobile-terminating call. The SUR_CSCF according to the first embodiment of the invention further comprises a virtual proxy in which a copy of a service content or service contents usually stored in the user equipment can be stored during the unregistration. The virtual proxy preferably comprises at least one execution environment which corresponds to the service platform for performing service contents when the conditions are fulfilled. Furthermore, the SUR_CSCF according to the first preferred embodiment of the invention comprises a database corresponding to the visitor location register of the GSM system, or a connection to the database in which it temporarily stores subscriber data of an unregistered subscriber. In a second preferred embodiment of the invention, the SUR_CSCF does not have a proxy nor a database nor a connection to the database. In other preferred embodiments of the invention, the SUR_CSCF may comprise either a proxy or a database or a connection to the database. The operation of the SUR_CSCF according to the invention is described in greater detail in FIGS. 2 and 3.

The interrogative call state control function I_CSCF only participates in controlling the establishment of a call made to a subscriber, and it determines how the mobile-terminating call is to be routed. In other words, it is authorized to route calls terminating at a subscriber station. In the system 1, the I_CSCF functions as an entry point for a mobile-terminating call and it interrogates the HSS in order to detect routing information. In the system of the invention, the routing information the I_CSCF obtains is always the address of a serving call state control function 2, and the invention does not require any changes to the interrogative call state control function.

The functionality of various call state control functions I_CSCF, S_CSCF and SUR_CSCF is not affected by the type of the access network. This means that the access network may be a wireless network, as in the example of FIG. 1, or a wired network.

The home subscriber server HSS logically corresponds to the home location register of the GSM system, and subscriber data 3 for each subscriber of the home network are stored therein either permanently or semi-permanently such that the subscriber data are combined with a subscriber identifier 4, which in the GSM system, for example, is IMSI (International Mobile Subscriber Identity). (FIG. 1 illustrates parts of subscriber data only for two subscribers.) In an address field 5, the home subscriber server HSS maintains subscriber-specific information on the address of the call state control function 2 serving the subscriber. In the first preferred embodiment of the invention, the address of the serving call state control function 2, which is used when the user equipment is not registered in the network, is maintained for each subscriber in an address field 6. In the second preferred embodiment of the invention, the home subscriber server maintains one common serving call state control function address which is used for all unregistered subscribers. In a third preferred embodiment of the invention, the address of the control function serving an unregistered subscriber is sometimes maintained for each subscriber separately, and sometimes a common address is used. The home subscriber server according to the third embodiment recognizes that the common address is used, for example because the subscriber data does not contain an address in the address field 6. In the first preferred embodiment of the invention, the home subscriber server always transmits the address of the address field 5 to the interrogative call state control function, and so during the unregistration of the subscriber the home subscriber server sets the address of the address field 6 to the address field 5. In the example of FIG. 1, for example, the subscriber with an identifier IMSI2 is a subscriber that is not registered in the network. In the second preferred embodiment of the invention, the home subscriber server checks whether the address field 5 is empty, and if it is, it transmits the commonly maintained address of the call state control function serving those that are not registered to the interrogative call state control function. However, regardless of the embodiment of the invention, the home subscriber server of the invention returns the address of the S_CSCF or that of the SUR_CSCF to the I_CSCF in response to the routing information request. The address may also be a pointer to the actual address.

In addition to prior art means, the system implementing the functions of the present invention and the network nodes of this system comprise means for providing a call state control function serving an unregistered subscriber and means for giving the address of this control function as a routing address in cases where the subscriber is not registered in the network. Moreover, the network nodes and the user equipment may comprise means for implementing the functions described in connection with FIGS. 2 and 3. The current network nodes and user equipment comprise processors and memory, which can be utilized in the functions according to the invention by configuring them. All changes necessary for implementing the invention can be made as added or updated software routines, by means of application-specific integrated circuits (ASIC) and/or programmable circuits, such as EPLD (Electrically Programmable Logic Device, FPGA (Field Programmable Gate Array).

Figure 2:
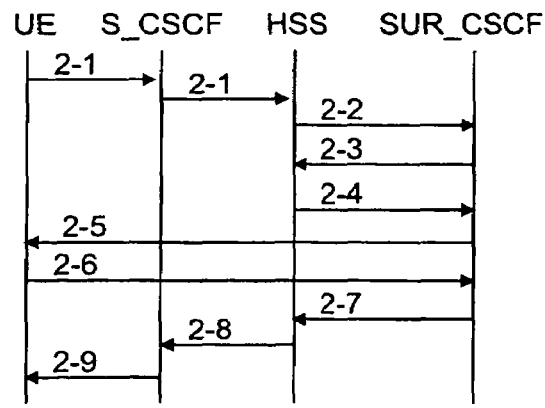
FIG. 2 illustrates signaling according to the first preferred embodiment of the invention, when a subscriber performs the unregistration in the network.

FIG. 2 illustrates signaling according to the first preferred embodiment of the invention when the subscriber station performs the unregistration. In the first preferred embodiment of the invention it is assumed that the subscriber is always registered in a serving call state control function. In the example of FIG. 2 it is assumed that the home subscriber server is responsible for registration procedures.

In the example of FIG. 2, the user equipment UE of the subscriber transmits an unregistration message 2-1 to the serving call state control function S_CSCF which forwards the message 2-1 to the home subscriber server HSS. The HSS starts the unregistration procedure by transmitting a message 2-2 to the call state control function SUR_CSCF serving the unregistered subscribers. In this message the HSS requests the control function to register the subscriber. The home subscriber server HSS obtains the address of the SUR_CSCF from the subscriber data. The message 2-2 preferably indicates that the unregistration has been started by the subscriber. The message 2-2 differs from an ordinary registration message in that it does not contain an IP address for the subscriber (user equipment). In response to the registration request of the message 2-2, the SUR_CSCF transmits a message 2-3 in which it requests subscriber data from the home subscriber server HSS. The home subscriber server HSS transmits subscriber data in a message 2-4, and the subscriber data is then stored by the SUR_CSCF in a database. The message 2-4 contains at least subscriber data relating to the services of a mobile-terminating call. In the first preferred embodiment of the invention, CAMEL subscriber data CSI of the subscriber are transmitted in the message 2-4. Since the message 2-2 indicated that the subscriber started the unregistration, the call state control function serving the unregistered subscribers SUR_CSCF transmits the user equipment UE of the subscriber a message 2-5 in which it requests the user equipment to transmit service contents in the user equipment to itself. In response to this request, the user equipment transmits at least those service contents to the SUR_CSCF in a message 2-6 that relate to services associated with a mobile-terminating call. The user equipment may also transmit all of its service contents in the message 2-6. After receiving the message 2-6, the SUR_CSCF stores the service contents the message contains. The service contents are preferably stored in connection with other subscriber data, but they can also be stored somewhere else. Thereafter, the SUR_CSCF transmits the home subscriber server HSS a message 2-7 in which the SUR_CSCF acknowledges the registration request as accepted. The home subscriber server HSS sets the address of the SUR_CSCF as the address of the call state control function serving the subscriber to the subscriber data and transmits the acknowledgement of the unregistration in a message 2-8 to the call state control function serving the subscriber S_CSCF which, in response to the message 2-8, deletes the subscriber data associated with the subscriber from its database and transmits the unregistration acknowledgement to the user equipment UE of the subscriber in a message 2-9.

When the subscriber registers in the network again, the subscriber data in the SUR_CSCF are deleted and the address of the SUR_CSCF is replaced by the address of the call state control function serving the user S_CSCF in the subscriber data of the home subscriber register.

If, in the first preferred embodiment of the invention, the unregistration is triggered by the HSS, for instance because no connection could be established with the user equipment, or the unregistration is triggered by a timer, the message 2-2 indicates that the unregistration is triggered in the network. In this case, the SUR_CSCF does not transmit the message 2-5, but instead it transmits the acknowledgement message 2-7 directly after storing the subscriber data. Naturally the messages 2-1, 2-6 and 2-9 are not transmitted. In another embodiment of the invention, the SUR_CSCF may try to set up a connection to the user equipment (i.e. to transmit the message 2-5) in order to obtain the service contents, although the unregistration was triggered by the network. In this embodiment, the message 2-2 need not indicate the source of the unregistration.

If the unregistration is triggered by the S_CSCF, the S_CSCF transmits the message 2-1 to the HSS and preferably indicates in the message that the unregistration was triggered by the S_CSCF.

In a preferred embodiment of the invention, the user equipment is arranged to transmit the service contents to the SUR_CSCF in its unregistration message. In other words, the message 2-1 contains the service contents of the user equipment. In this embodiment the messages 2-5 and 2-6 are not transmitted.

In a preferred embodiment of the invention, the service contents of the user equipment are also maintained in a server or the like in the network. The service contents may be retrieved by using the subscriber identity which can, for example, be a part of an internet uniform resource locator (URL) of the service contents of the user equipment. Another possibility is that the user equipment only transmits a pointer or pointers to the service content(s) and the potential parameters in the message 2-1 or 2-5.

In a preferred embodiment of the invention, the SUR_CSCF is arranged to wait for the reply 2-6 for a predetermined time. If the reply does not arrive within the predetermined time, the SUR_CSCF interprets it so that there were no service contents in the user equipment, and so it transmits the message 2-7. This embodiment provides the advantage that all user equipment need not support the transmission of the service contents to the network.

In a preferred embodiment of the invention, the service content or a part of the service content of the user equipment is not copied to the SUR_CSCF. In this embodiment the message 2-2 does not indicate what has triggered the unregistration, nor does the SUR_CSCF transmit the message 2-5 (and correspondingly, the user equipment does not transmit the message 2-6).

In a preferred embodiment of the invention, the SUR_CSCF stores at least subscriber data relating to the services of a mobile-terminating call permanently in its database which it uses. In this embodiment, the SUR_CSCF checks after the message 2-2 whether the subscriber data or some of the subscriber data are to be found in the database, and if they are, the SUR_CSCF checks whether also service content(s) is/are to be found, and if they are found, too, the SUR_CSCF transmits the message 2-7 in response to the message 2-2. In this embodiment, the HSS can be arranged to update subscriber data each time the information of the HSS is updated.

In a preferred embodiment of the invention, the user equipment is arranged to transmit its service content(s) or a pointer/pointers and potential parameters to the network during each registration in the network, and the network is arranged to transmit the information transmitted by the user equipment to the SUR_CSCF which stores the information such that it can be used when the user equipment is not registered in the network. In another preferred embodiment of the invention, the user equipment transmits the information only when it detects that its service content(s) have changed.

In the second preferred embodiment of the invention, when the subscriber performs the unregistration in the network, the HSS deletes the address of the S_CSCF and transmits an acknowledgement of this. In the second preferred embodiment of the invention, only the messages 2-1 and 2-8 are transmitted, and, if it was the subscriber that triggered the unregistration, also the message 2-9.

Figure 3:
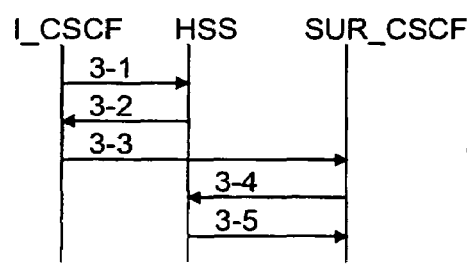
FIG. 3 illustrates signaling according to a second preferred embodiment of the invention in connection with a mobile-terminating call to the subscriber that is not registered in the network.

FIG. 3 illustrates operation according to the second preferred embodiment of the invention, when a call is terminating at a subscriber that is not registered in the network. The interrogative call state control function I_CSCF requests a routing instruction from the home subscriber server HSS of the user equipment in a message 3-1. The HSS checks the address of the call state control function serving the subscriber. Since it is empty, the HSS gives the SUR_CSCF address common to all subscribers as the routing instruction in a message 3-2 in the second preferred embodiment of the invention. Thereafter, the I_CSCF transmits a call set-up request to the SUR_CSCF in a message 3-3. In the second preferred embodiment of the invention, the SUR_CSCF does not store data on the subscriber in its files, nor does the subscriber register in the SUR_CSCF. In a message 3-4, it transmits a subscriber data request to the home location server HSS which transmits at least those subscriber data that relate to services of a mobile-terminating call to the SUR_CSCF in a message 3-5. The same subscriber data as in the message 2-4 are preferably transmitted in the message 3-5. By means of these subscriber data, the SUR_CSCF triggers the required services when the triggering conditions are fulfilled. More specifically, the SUR_CSCF immediately starts to implement the additional services according to the "not reachable"-state, and does not try to route the call to the subscriber.

The second preferred embodiment of the invention provides the advantage that subscriber data are not unnecessarily transmitted to the SUR_CSCF, but they are only transmitted when they are needed.

In a preferred embodiment of the invention, which is based on the second preferred embodiment, in response to giving the SUR_CSCF address as the routing address of the subscriber in the message 3-2, the home subscriber server HSS transmits at least those subscriber data that relate to the services of a mobile-terminating call to the SUR_CSCF in the message 3-5. Thus, in this embodiment the SUR_CSCF need not separately request the subscriber data (i.e. the message 3-4 is not transmitted).

In a preferred embodiment of the invention, which is based on the second preferred embodiment, the SUR_CSCF stores the subscriber data received in the message 3-5 in a database and checks before transmitting the message 3-4, whether the data on the subscriber indicated in the message 3-3 are to be found in the file, and if they are, the SUR_CSCF uses them and does not transmit the message 3-4. In this embodiment, the home subscriber server is arranged to transmit a deregistration message to the SUR_CSCF during the subscriber's registration in the network (and in the S_CSCF). Because of the deregistration message, the SUR_CSCF deletes the data on the subscriber from its file.

In a preferred embodiment of the invention, which is based on the second preferred embodiment, the SUR_CSCF is arranged to store the service content(s) or the pointer/pointers to the service content(s) and the potential parameters, which are transmitted by the user equipment to the network.

In the first preferred embodiment of the invention, the subscriber data are in the SUR_CSCF, so the messages 3-4 and 3-5 are not needed.

The signaling messages in FIGS. 2 and 3 are not in an absolute chronological order and they can be transmitted in a different order. Other signaling messages can also be transmitted, and/or other functions can be performed also between the messages. For example, the SUR_CSCF can store only those subscriber data that relate to the services of a mobile-terminating call, although the home subscriber server would also transmit other subscriber data. Some of the messages shown in FIGS. 2 and 3 can also be left out. The signaling messages are only examples and they may comprise several independent messages for transferring the same information. In addition, the messages may also comprise other information.

The above preferred embodiments of the invention are only examples, and in order to have new embodiments according to the invention the features described in the embodiments can be combined in a different manner than what is described above.

In the above, the term 'call' not only refers to a common call but also to other, possibly virtual, connection states whereto user data transmission, such as data session or packet data transmission, is associated. Examples include a packet radio session (such as a GPRS session), VoIP (Voice over IP) session and multimedia session according to H.323. User data may include a variety of components, such as voice, video image and data. The term 'call' also covers signaling required in the transmission of user data flow, and services similar to a call, which may be unidirectional, directed to a group (or groups) or broadcasts in a specific area, for instance.

Although the invention has been described above assuming that the service is triggered when the triggering conditions are fulfilled, it is obvious to a person skilled in the art how to apply the invention when there are no triggering conditions, i.e. in cases where the service is always triggered.

Although the invention has been described above such that a call state control function serves unregistered subscribers it is it is obvious to a person skilled in the art that unregistered subscribers can be served by other functions/network nodes, such as a SIP CPS (Call Processing Server), for example.

It is obvious to a person skilled in the art that as technology develops, the basic idea of the invention can be implemented in a variety of ways. The invention and the embodiments thereof are not restricted to the above examples, but may be modified within the scope of the claims.

The invention claimed is:

1. A method for providing a service in connection with a call terminating at a subscriber when the subscriber is not registered in a network, the method comprising at least:
   maintaining in the network at least one first function for unregistered subscribers which first function triggers at least one first service associated with the terminating call for the subscriber when the subscriber is not registered in the network; and
   routing the call terminating at the subscriber to the first function when the subscriber is not registered in the network.

2. The method of claim 1, further comprising copying, during an unregistration of the subscriber, at least first service information of subscriber data of the subscriber from a network node maintaining the subscriber data of the subscriber to a database used by the first function.

3. The method of claim 1 further comprising:
   receiving the call terminating at the subscriber in the first function;
   transmitting subscriber's service information from a network node maintaining the subscriber data of the subscriber to the first function; and
   starting the triggering of services in the first function.

4. The method of claim 1, further comprising the steps of:
   receiving the call terminating at the subscriber in the first function;
   checking whether a database used by the first function contains subscriber's service information;
   if the database contains subscriber's service information, starting the triggering of services;
   if the database does not contain subscriber's service information, the method further comprises:
      requesting at least first service information associated with the call terminating at the subscriber from a network node maintaining subscriber data of the subscriber; and
      in response to the reception of the requested service information, storing the received subscriber's service information in the database and starting the triggering of the service.

5. The method of claim 1, wherein the first function triggers the service when triggering conditions are fulfilled.

6. The method of claim 5, wherein the service is triggered in an execution environment which is an internal environment of the first function.

7. The method of claim 5, wherein the service is triggered in an execution environment which is an external environment of the first function.

8. The method of claim 1, further comprising the steps of:
   maintaining in the first function an execution environment corresponding to user equipment in order to perform at least one service content; and
   loading at least one service content or the address of the service content associated with the call terminating at the subscriber from the user equipment to the first function.

9. The method of claim 8, wherein the loading is performed during an unregistration of the subscriber.

10. The method of claim 1, wherein the first function is a call state control function.

11. The method of claim 1, wherein the first function is a session initiation protocol call processing server.

12. A method for providing a service in connection with a call terminating at a subscriber when the subscriber is not registered in a network, the method comprising at least:
   maintaining in the network at least one first function for unregistered subscribers which first function triggers, when triggering conditions are fulfilled, at least one first service associated with the terminating call for the subscriber when the subscriber is not registered in the network;
   copying at least first service information of subscriber data of the subscriber from a home subscriber server maintaining the subscriber data to a database used by the first function during an unregistration of the subscriber; and routing the call terminating at the subscriber to the first function when the subscriber is not registered in the network.

13. A method for providing a service in connection with a call terminating at a subscriber when the subscriber is not registered in a network, the method comprising at least:

maintaining in the network at least one first function for unregistered subscribers which first function triggers, when triggering conditions are fulfilled, at least one first service associated with the terminating call for the subscriber when the subscriber is not registered in the network;

routing the call terminating at the subscriber to the first function when the subscriber is not registered in the network;

receiving the call terminating at the subscriber in the first function;

transmitting subscriber's service information from a home subscriber server maintaining subscriber data of the subscriber to the first function; and starting the triggering of services in the first function.

14. A method for providing a service in connection with a call terminating at a subscriber when the subscriber is not registered in a network, the method comprising at least:

maintaining in the network at least one first function which triggers when triggering conditions are fulfilled at least one first service associated with the terminating call for the subscriber when the subscriber is not registered in the network;

routing the call terminating at the subscriber to the first function when the subscriber is not registered in the network;

receiving the call terminating at the subscriber in the first function;

checking whether a database used by the first function contains subscriber's service information;

if the database contains subscriber's service information, starting the triggering of services;

if the database does not contain subscriber's service information, the method further comprises:
  requesting at least first service information associated with the call terminating at the subscriber from a home subscriber server maintaining subscriber data of the subscriber; and
  in response to the reception of the requested service information, storing the received subscriber's service information in the database and starting the triggering of the service.

15. A communication system comprising
at least one first function for triggering a service associated with a call terminating at a subscriber of the communication system when the subscriber is not registered in the communication system, and
at least one first network node for giving a routing address of a subscriber for a call terminating at the subscriber, the first network node being configured to give the address of the first function as the routing address when the subscriber is not registered in the communication system.

16. The communication system of claim 15, wherein the first network node transmits at least subscriber data associated with the terminating call to the first function in response to a subscriber data request of the first function.

17. The communication system of claim 16, wherein the first function requests subscriber data from the first network node in response to the subscriber's registration in the first function.

18. The communication system of claim 16, wherein the first function requests subscriber data from the first network node in response to the reception of the call terminating at the subscriber.

19. The communication system of claim 15, wherein
the first network node transmits at least subscriber data associated with the terminating call to the first function in response to changes in subscriber data, and
the first function stores at least the subscriber data associated with the terminating call and update them in response to the subscriber data received from the first network node.

20. The communication system of claim 15, further comprising at least one unit of user equipment for transmitting at least one service content associated with the call terminating at the subscriber to the first function for receiving and storing the service content and wherein the first function comprises an execution environment for performing the received and stored service content.

21. The communication system of claim 15, further comprising
at least one unit of user equipment for transmitting at least one pointer to the service content associated with the call terminating at the subscriber to the first function for receiving and storing the pointer,
at least one execution environment for performing the service content, and
memory means for maintaining the service content in the system.

22. A network node in a communication system where a service associated with a call terminating at a subscriber is triggered in that network node of the communication system to which network node calls terminating at the subscriber are routed, the network node comprising at least one interface for the subscriber, by which interface at least one service associated with the call terminating at the subscriber is triggered when the subscriber is not registered in the communication system.

23. The network node of claim 22, wherein the network node is configured to receive subscriber data of the subscriber when the subscriber performs an unregistration in the network.

24. The network of claim 23, the network node further comprising an execution environment corresponding to the execution environment of user equipment in the communication system, and at least some of the subscriber data relate to at least one service content in the user equipment.

25. The network node of claim 22, wherein the network node is configured to request subscriber data of the subscriber in response to the routing of the call terminating at the subscriber to the network node.

26. The network node of claim 22, wherein the network node is configured to store at least subscriber data relating to the terminating call in a first database used by the network node.

27. The network node of claim 26, wherein the network node is configured to check whether subscriber data of the subscriber are stored in the first database and to request only those subscriber data that the network node needs for triggering a service associated with the terminating call and that are not stored in the database.

28. A network node which is configured to give routing information of a subscriber and to recognize whether the subscriber has performed an unregistration in the network, the network node further being configured to give an address of the first function, which triggers services of subscribers that are not registered in the network if the triggering conditions are fulfilled, as a routing address for the subscriber when the subscriber is not registered in the network.

29. The network node of claim 28, wherein the network node is configured to maintain the address of the first function for each subscriber separately.

30. The network node of claim 28, wherein the network node is configured to set the address of the first function as a routing address of the subscriber in response to the subscriber performing the unregistration in the network.

31. The network node of claim 28, wherein the network node is configured to give the address of the first function as a routing address in response to the absence of the routing address of the subscriber.

32. User equipment in a communication system, the user equipment comprising at least one service content for providing a service associated with a call terminating at a subscriber, and being configured to transmit information associated with the service content to the communication system in order to provide the service when the user equipment is not registered in the communication system.

33. The user equipment of claim 32, wherein said information comprises the service content.

34. The user equipment of claim 32, wherein said information comprises a pointer which points to the service content.

35. The user equipment of claim 34, wherein said information further comprises at least one value of a parameter associated with the service content.

36. The user equipment of claim 32, wherein the user equipment is configured to transmit said information when it registers in the communication system.

37. The user equipment of claim 32, wherein the user equipment is configured to transmit said information in response to changes in the service content.

38. The user equipment of claim 32, wherein the user equipment is configured to transmit said information when it performs the unregistration in the communication system.

39. The user equipment of claim 32, wherein the user equipment is configured to transmit said information in response to a request received from the system.

* * * * *